Nov. 22, 1955  W. J. LORIA ET AL  2,724,262
TIMEPIECE CALIBRATION INDICATING APPARATUS
Filed Jan. 17, 1952  2 Sheets-Sheet 2
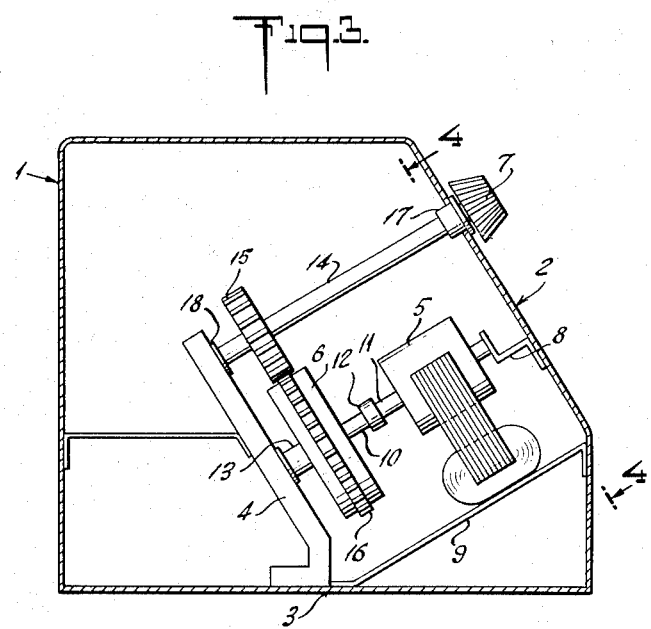
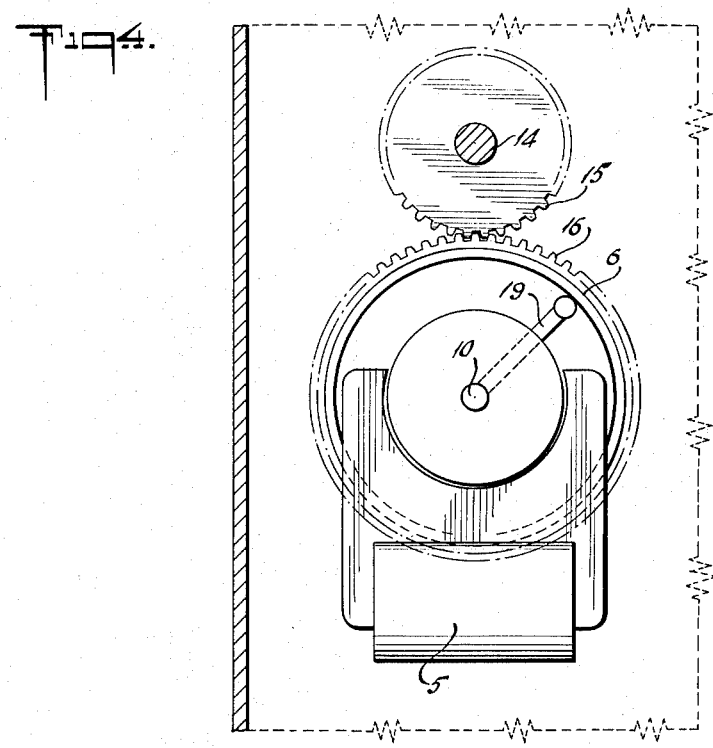

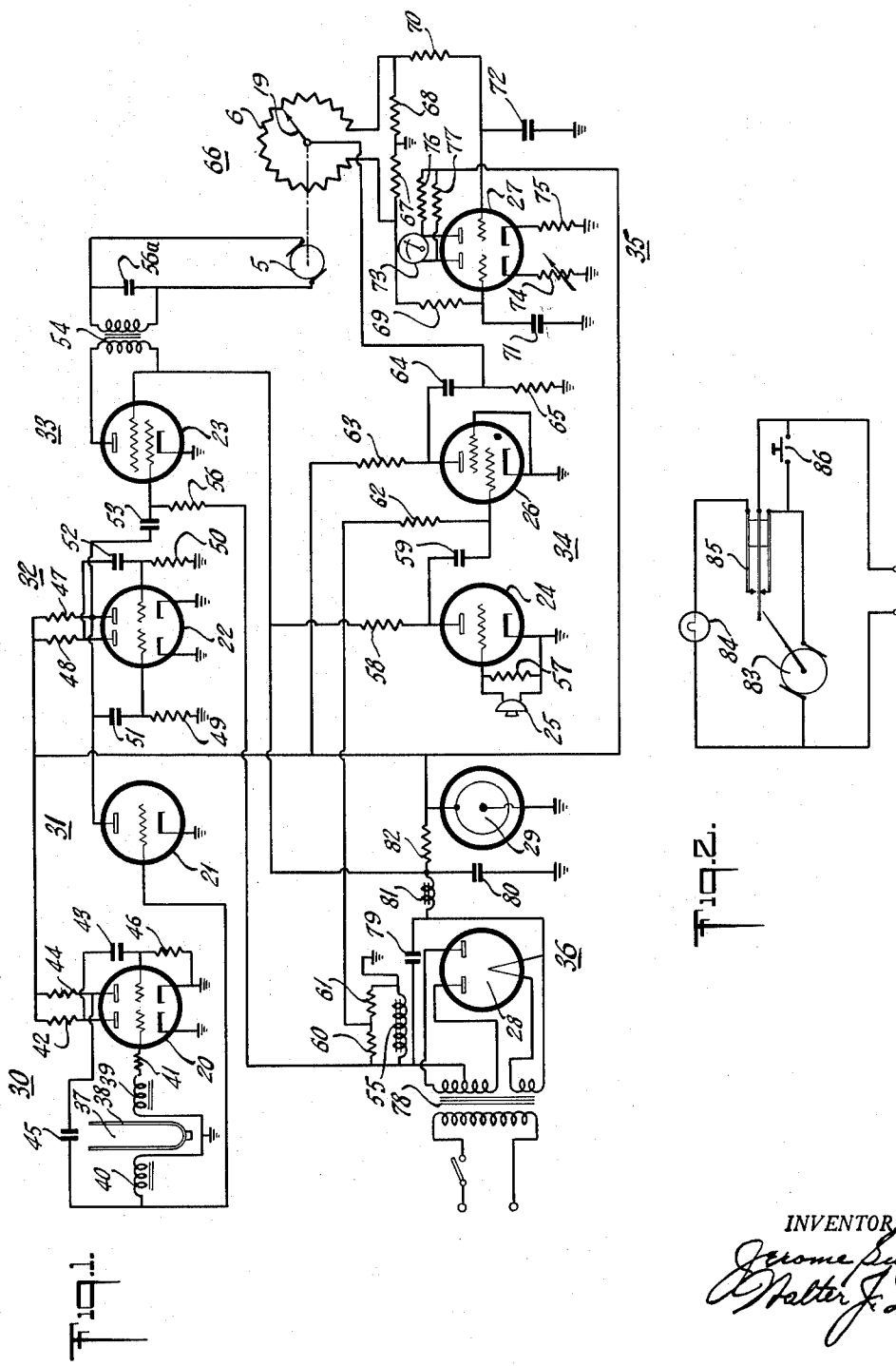

United States Patent Office 2,724,262
Patented Nov. 22, 1955

2,724,262

TIMEPIECE CALIBRATION INDICATING APPARATUS

Walter J. Loria and Jerome Suhre, New York, N. Y.

Application January 17, 1952, Serial No. 266,906

6 Claims. (Cl. 73—6)

The present invention relates to timepiece calibration apparatus and more particularly to such apparatus of the all-electronic type which is substantially inertia-less for indicating the accuracy of a watch or clock in order to observe its rate of gain or loss of time.

In the repair or adjustment of a watch or clock and also in routine tests, it is essential to speedily determine the accuracy thereof.

Heretofore, it has been usual for the horologist to utilize the old time worn method of observing the rate of gain or loss of a watch or clock over a long period of time as compared with a standard chronometer. Other methods have been developed. Numbered among these are recording instruments which print a record utilizing a rotating drum and stylus action to print. The Stroboscopic principle has been applied to visual indicators. These instruments are incapable of indicating on a rate of gain or loss meter, any gain or loss for visual inspection. The present invention contemplates the provision of a watch or clock calibrating device that is sensitive to the beat of any watch or clock and accurately checks and indicates the degree of regulation of the timepiece under examination, so that the rate of gain or loss will be indicated on a visual rate of gain or loss meter.

In assembling watches or clocks, it is customary in the factory to check the accuracy of the movement before assembling and delivering. The present invention contemplates the provision of a watch and a clock calibrating device which is far more simple to operate and much faster in action than any of the known methods for watch and clock regulation, and which, in watch and clock assembly will afford the assembler a basis for speedier adjustment and will generally afford the horologist a method for quick and accurate timepiece calibration and adjustment.

More specifically, the present invention provides an indicating device for indicating the accuracy of a watch or clock, which is simple and automatic in operation, and which does not require the use of graph or other recording paper.

In accordance with the invention, there is provided timepiece calibration apparatus, comprising an electrical pickup effective to derive periodic electrical signals, precisely related in frequency to the timing of a timepiece being calibrated. A standard source of periodic electrical signals and an indicating device adapted to indicate the rate of gain or loss of the timepiece under calibration.

For a better understanding of the present invention, together with other and further objects thereof, reference is made to the following description taken in connection with the accompanying drawings, and its scope will be pointed out in the appended claims. The accompanying drawings referred to herein and constituting a part hereof, illustrate an embodiment of the invention, and together with the description serve to explain the principles of the invention.

Figures 1 and 2 are schematic wiring diagrams of electrical elements used in the apparatus. Figure 3 is a side elevation, partly in cross section of one embodiment of the calibration apparatus, according to the present invention. Figure 4 is a front elevation, partially in cross section of a section of Figure 3.

Referring now to Figures 3 and 4 of the drawings, the timepiece calibration indicating apparatus embodying the invention and adapted to indicate the rate of gain or loss on an indicating device, comprises a portable casing 1; secured to the front panel 2, and the base portion 3, there is provided a mounting 4, so arranged as to receive synchronous motor 5, potentiometer 6, and control means 7.

Specifically synchronous motor 5 is affixed to front panel 2, by means of bracket 8, and base plate 9. Potentiometer 6, is affixed to mounting 4 by bearing 13, so as to be fully rotatable by means of control knob 7, shaft 14, and gears 15 and 16. Gear 16 is arranged around the periphery of potentiometer 6, and the gear 15 is mounted on shaft 14 and in mesh with gear 16. Potentiometer shaft 10 is coupled to motor shaft 11, by means of coupling 12. Synchronous motor 5 is of a conventional type designed to rotate at 300 R. P. M. when fed by 60 cycle A. C. supply. Shaft 14 is supported by bearing 17 mounted in panel 2 and bearing 18 set in mounting 4.

Referring now to Figure 4, the potentiometer arm 19 is fuly rotatable, within a complete 360 degree arc and is continuously rotated by means of synchronous motor 5.

Referring to Figure 1, units 30, 31, 32 and 33 comprise the motor drive unit, with sufficient wattage output to drive synchronous motor 5. Unit 34 is a microphone amplifier. Unit 35, is a conventional vacuum tube voltmeter. Unit 36, is a conventional, voltage regulated power supply.

Specifically, unit 30, is a precision oscillator circuit whose frequency is mechanically determined by the fundamental frequency of tuning fork 37 in a conventional manner. Briefly, vibration of tine 38, at the natural frequency of tuning fork 37 induces a periodic voltage of the same frequency in the pick-up winding 39. This voltage is fed through resistor 41 into the grid-cathode circuit of the first triode section of vacuum tube 20. The output is developed across the load resistor 42 in the anode circuit. This amplified output voltage is fed through the capacitor 43 into grid-resistor 46, and the grid-cathode circuit of the second triode section. The amplified output of the second section is developed across load resistor 44, in the anode circuit of the second triode section and fed back to actuating winding 40, through coupling condenser 45. This regenerative action maintains the tuning fork 37 in oscillation at its natural frequency in a conventional manner well understood in the art, and develops a periodic voltage across actuating coil 40 constituting a source of constant frequency. This voltage is directly coupled to grid-cathode circuit of vacuum tube 21 of amplifier unit 31. The output of amplifier tube 21 is developed across resistor 47.

Unit 32 is a conventional multivibrator unit or frequency divider, whose purpose is to divide the frequency developed by the tuning fork oscillator to the frequency required by the synchronous motor 5. For instance, for a tuning fork having a natural frequency of 240 cycles a division by four by the multivibrator will result in an output frequency of 60 cycles, required by the synchronous motor 5.

Multivibrator unit 32 comprises vacuum tube 22 anode load resistors 47 and 48, grid resistors 49 and 50 and coupling condensers 51 and 52. Frequency division is accomplished by the normal means of impressing the input signal developed across load resistor 47, and extracting an exact submultiple which is fed into unit 33, by means of coupling condenser 53.

Unit 33 consists of a power output vacuum tube 23 which drives synchronous motor 5 through the coupling transformer 54. Vacuum tube 23 is a beam power tube biased to cut-off by the negative voltage and applied to the grid through resistor 56 developed across the filter choke 55. The output of unit 32 is applied to the grid cathode input of amplifier tube 23. The effect of operating tube 23 at cut-off is to cause rectification of the output and producing a unilateral pulsating wave comprising short duration pulses in the primary winding of transformer 54. The secondary winding of transformer 54 is tuned to 60 cycles per second by means of capacitor 56a. The impulses induced in this secondary winding from the primary produces a 60 cycle sine wave output power to drive synchronous motor 5 at a speed precisely controlled by tuning fork 37.

Unit 34 consists of vacuum tubes 24 and 26, and microphone 25, vacuum tube 24 being the watch tick amplifier and tube 26 being a pulse shaper.

Specifically, the watch tick amplifier consists of microphone 25 shunted by resistor 57. The microphone 25 being a conventional crystal contact type, cushioned to absorb outside shocks and effective to develop signals representative of the frequency of the sound beats of the timepiece being calibrated. The signals developed by the microphone from the sound beats of the timepiece under calibration are applied directly to the grid-cathode input circuit of vacuum tube 24. The amplified output voltage appearing across the anode load resistor 58 is coupled by capacitor 59 to the grid-cathode input circuit of thyratron 26. The thyratron is normally biased to cut-off by one half of the voltage appearing across filter choke 55. This division is accomplished by the two equal resistors 60 and 61 and applied to the grid of the thyratron through resistor 62. The series circuit formed by condenser 64 and resistor 65 are connected across the anode and cathode of thyratron 26. Condenser 64 is charged to a voltage equal to the regulated power supply voltage through resistor 63. Since the thyratron is in a non-conductive condition during the absence of the timepiece signal on its grid, condenser 64 will remain charged. Upon the application of the amplified signal of the timepiece under calibration to the control grid of thyratron 26, the thyratron conducts or "fires" thereupon discharging condenser 64 through resistor 65. The discharge of the condenser in the anode circuit of the thyratron through resistor 65 produces a sharply peaked voltage across resistor 65. This sharp pulse of constant amplitude is applied to the rotating arm 19 of potentiometer 6.

Unit 66 is a resolver circuit. It comprises a synchronous motor driven pototentiometer consisting of synchronous motor 5 and potentiometer 6 and resistors 67 and 68. The potentiometer 6 and the two resistors 67 and 68 comprise a Wheatstone bridge circuit. Resistors 67 and 68 comprise two arms of the bridge and the other two arms of the bridge are composed of the resistance of the potentiometer. The output voltage appears at the two ungrounded ends of resistances 67 and 68.

As previously described the synchronous motor 5 is driven at a constant rate of speed preferably 300 R. P. M. (5 R. P. S.), thus causing the potentiometer arm 19, to continuously rotate at this speed. Since simultaneously the pulses from the output of vacuum tube 26 are fed to the rotating arm of the bridge, and are of constant amplitude, any phase difference will be due to the rate of lag or gain produced by the beat of timepiece under calibration. This is so because the rate of revolution of the potentiometer arm is constant and determined by the precision tuning fork oscillator control.

As is well known in the art, the standard watch beat is at the rate of 300 beats per minute or 5 beats per second.

In the event, the timepiece is keeping perfect time, that is, in synchronism with the tuning fork controlled motor, then the arm of the potentiometer will always be in the same angular position at the instant of each tick of the watch. Since the pulses fed into the potentiometer 6 (Resolver) are of constant strength then the output of the resolver will remain unchanging and the indicating meter 73 will also remain unchanged. That is, it will remain on zero.

If the timepiece is running fast, then the resolver arm will not quite complete one full revolution before the next tick arrives and hence the output will decrease with each successive tick.

Conversely if the timepiece is running slow the arm will complete more than one revolution between successive ticks and the output of the resolver circuit will increase.

This increase or decrease in the electrical output of the resolver circuit is applied as a negative or positive voltage to the grids of the vacuum tube voltmeter. This causes the zero-centered indicating meter's needle to rise or fall across the scale of the meter which is calibrated in seconds gain or loss per 24 hour day.

It is clear then that zero reading on the indicating meter 73 will only be obtained when the watch tick pulse coincides with a position of the potentiometer arm which is at mid-resistive point. That is, at a point which is midway between zero resistance and maximum resistance. However, as is most often the case, when beginning the calibration of a watch the potentiometer arm may be in any position. When this is the case the indicating needle would rise or fall about a point which is not the zero center or the indicating meter scale.

To insure always starting the timing or calibration at the mid-point of the indicating meter scale and the mid-point of resistive element of the potentiometer a zero setting or synchronizing control knob 7 is provided. The function of this knob is merely to turn the body of the potentiometer 6 i. e. the portion containing the resistive element, but not the rotating arm 19 which is turned only by the motor. Turning the knob 7 rotates the body of the potentiometer 6 to a point where the arm 19 of the potentiometer 6 will be at the mid-resistive point at the instant the watch tick occurs.

As previously stated, the phase difference between the rate of rotation of potentiometer arm 19 and the timepiece beat as amplified and fed from thyratron 26 is impressed on the grid circuits of vacuum tube 27 through resistors 69 and 70. Condensers 71 and 72 connected to the grids of vacuum tube 27 are damping condensers whose function is to stabilize the indicating needle on electric meter 73. Cathode resistors 74 and 75 are conventional bias resistors. Resistor 74 is made variable to attain balance in the vacuum tube voltmeter circuit. Resistors 76 and 77 are the anode circuit load resistors across which is connected the indicating electric meter 73.

Unit 36 is the voltage regulated power supply, conventional in construction comprising an input transformer 78 having its primary connected to the AC power line. The high voltage, center-tapped, secondary is connected to the anodes of vacuum tube rectifier 28, condensers 79 and 80, together with the filter choke 81 complete the power supply. Vacuum tube 29 is of the voltage regulation type and is connected to the full wave power supply through resistor 82. It is the characteristic of this tube to maintain a constant voltage across itself.

Figure 2 is a timing unit consisting of a synchronous motor 83 running at 1 R. P. M. and an electric light, a single pole double throw switch 85 and momentary contact switch 86. The timing unit in Figure 2 is designed as a time delay switch causing the light circuit switch to be closed after completion of one minute interval. This is conventional one minute time delay switch.

To calibrate a timepiece then it is only necessary to place it in contact with the microphone and observe indicating meter 73 needle which is normally at zero center. The needle will remain at zero center if the watch is keeping perfect time and is synchronized to the motor rotated potentiometer arm. If the watch is keeping perfect time, but is not synchronized in beat to the rotating potentiometer, then the meter indicating needle will rise or fall on the scale coming to rest at a point whose angular displacement from zero center is indicative of the leading or lagging phase error between the rotating potentiometer arm and the watch under calibration. Turning the above mentioned control knob will then bring the indicating meter 73 needle to zero so that timing of the watch can begin. When the needle reaches zero the timing button 86, is depressed and the instrument continues in operation for one full minute. At the end of this time, an electric light 84 placed behind the translucent indicating meter 73 scale, flashes on, indicating that the rate of the watch can now be read. Depressing the timing button 86 merely starts a small clock motor 83 which mechanically operates an electric switch to turn on the above mentioned electric light after one minute time.

While we have described in detail a modification of the present invention illustrated as embodied in a watch rate indicating instrument, it is to be understood that changes may occur to those skilled in this art.

The invention in its broader aspects is not limited to the specific mechanism shown and described but departures may be made therefrom within the scope of the accompanying claims without departing from the principles of the invention and without sacrificing its chief advantages.

What is claimed is:

1. Timepiece calibration indicating apparatus comprising; an electrical pickup effective to derive periodic electrical signals precisely related in frequency to the timing of a timepiece being calibrated; a standard source of periodic reference electrical signals; a bridge circuit including voltage-dividing means having a continuously rotatable element; means responsive to said periodic reference electrical signals to rotate said element of the said voltage dividing means at a speed proportional to the frequency of said reference signals; means responsive to the derived electrical signals to produce a signal of constant amplitude; means to apply said signal of constant amplitude to said rotatable element to produce an electrical effect across said voltage dividing means varying with the position of said rotatable element, said electrical effect being representative of the phase difference between the derived periodic electrical signals and the priodic reference signals, and an electric indicating device, energized by said electric effect, and indicating the phase difference between the derived periodic electrical signals and the periodic reference electrical signals, indicative of the calibration of said time piece.

2. Timepiece calibration indicating apparatus; comprising an electrical microphone effective to derive periodic electrical signals representative of the sound beats of a timepiece being calibrated in duration and frequency; a standard source of periodic reference electrical signals; a bridge circuit including a potentiometer having a continuously rotatable contact element; means responsive to said periodic electrical reference signals to rotate said contact element of the said potentiometer at a speed proportional to the frequency of said reference signals; means responsive to the derived electrical signals adapted to produce an electrical signal of constant amplitude; means to apply said signal of constant amplitude to said rotatable element to produce an electrical effect across said potentiometer varying with the position of said rotatable element thereof, said electrical effect being representative of the phase difference between the derived periodic electrical signals and the periodic reference signals, and an electric indicating device energized by said electric effect, and indicating the phase difference between the derived periodic electrical signals and the periodic reference electrical signals, indicative of the calibration of said timepiece.

3. Timepiece calibration indicating apparatus comprising; an electrical microphone effective to derive periodic electrical signals representative of the sound beats of a timepiece being calibrated in duration and frequency; a standard source of periodic reference electrical signals; a bridge circuit including voltage-dividing means having a continuously rotatable element; means for mounting said voltage-dividing means for rotation concentrically with, in the same plane as, and independently of said rotatable element; means responsive to said periodic electrical reference signals to rotate said element of said voltage-dividing means at a speed proportional to the frequency of said reference signals; means responsive to the derived electrical signals adapted to produce an electrical signal of constant amplitude; means to apply said signal of constant amplitude to said rotatable element to produce an electrical effect across said voltage-dividing means varying with the position of said rotatable element thereof, said electrical effect being representative of the phase difference between the derived periodic electrical signals and the periodic reference signals, and an electric indicating device energized by said electric effect, and indicating the phase difference between the derived periodic electric signals and the periodic reference electric signals, indicative of the calibration of the timepiece.

4. Timepiece calibration indicating apparatus comprising; an electrical pickup effective to derive periodic electrical signals precisely related in frequency to the timing of a timepiece being calibrated; a standard source of periodic reference electrical signals having a frequency of a value commensurable with the normal frequency of the sound beats of said timepiece; a bridge circuit including voltage-dividing means having a continuously rotatable element said element of said voltage-dividing means; means for mounting said voltage-dividing means for rotation concentrically with, in the same plane as, and independently of said rotatable element; means responsive to said periodic electrical reference signals to rotate said element of said voltage-dividing means at a speed proportional to the frequency of said reference signals; means responsive to the derived electrical signals adapted to produce an electrical signal of constant amplitude; means to apply said signal of constant amplitude to said rotatable element to produce an electrical effect across said voltage-dividing means varying with the position of said rotatable element thereof, said electrical effect being representative of the phase difference between the derived periodic electrical signals and the periodic reference signals, and an electric indicating device energized by said electric effect, and indicating the phase difference between the derived periodic electrical signals and the periodic reference electrical signals, indicative of the calibration of said timepiece.

5. Timepiece calibration indicating apparatus comprising; an electrical microphone effective to derive periodic electrical signals representative of the sound beats of a timepiece being calibrated in duration and frequency; a standard source of periodic reference electrical signals; a bridge circuit including voltage-dividing means having a continuously rotatable element; means for mounting said voltage-dividing means for rotation concentrically with, in the same plane as, and independently of said rotatable element; means responsive to said periodic electrical reference signals to rotate said element of said voltage-dividing means at a speed proportional to the frequency of said reference signals; means responsive to the derived electrical signals adapted to produce an electrical signal of constant amplitude; means to apply said signal of constant amplitude to said rotatable element to produce an electrical effect across said voltage-dividing means varying with the position of said rotatable element thereof, said electrical effect being representative of the phase difference between the derived periodic electrical signals and the periodic reference signals, and an electric indicating device energized by said electric effect, and indicating the phase difference between the derived periodic electrical signals and the periodic reference electrical signals, indicative of the calibration of said timepiece.

6. Timepiece calibration indicating apparatus comprising; an electrical microphone effective to derive periodic electrical signals representative of the sound beats of a timepiece being calibrated in duration and frequency; a standard source of periodic reference electrical signals; a bridge circuit including voltage-dividing means having a continuously rotatable element; a driving mechanism for continuously rotating said variable element; means for mounting said voltage-dividing means for rotation concentrically with, in the same plane as, and independently of said rotatable element; means responsive to the said electrical reference signals to energize said driving mechanism for continuously rotating said element of said voltage-dividing means at a speed proportional to the frequency of said reference signals; means responsive to the derived electrical signals adapted to produce an electrical signal of constant amplitude; means to apply said signal of constant amplitude to said rotatable element to produce an electrical effect across said voltage-dividing means varying with the position of said rotatable element thereof, said electrical effect being representative of the phase difference between the derived periodic electrical signals and the periodic reference signals and an electric indicating device energized by said electric effect, and indicating the phase difference between the derived periodic electrical signals and the periodic reference electrical signals, indicative of the calibration of said timepiece.

References Cited in the file of this patent

UNITED STATES PATENTS

| | | |
|---|---|---|
| 1,769,988 | Davis | July 8, 1930 |
| 2,188,059 | Norrman et al. | Jan. 23, 1940 |
| 2,425,613 | Gibbs | Aug. 12, 1947 |
| 2,499,000 | Quarles | Feb. 28, 1950 |
| 2,544,482 | Barnes | Mar. 6, 1951 |
| 2,588,748 | Niles et al. | Mar. 11, 1952 |
| 2,687,511 | Penniman | Aug. 24, 1954 |